United States Patent Office 2,805,627
Patented Sept. 10, 1957

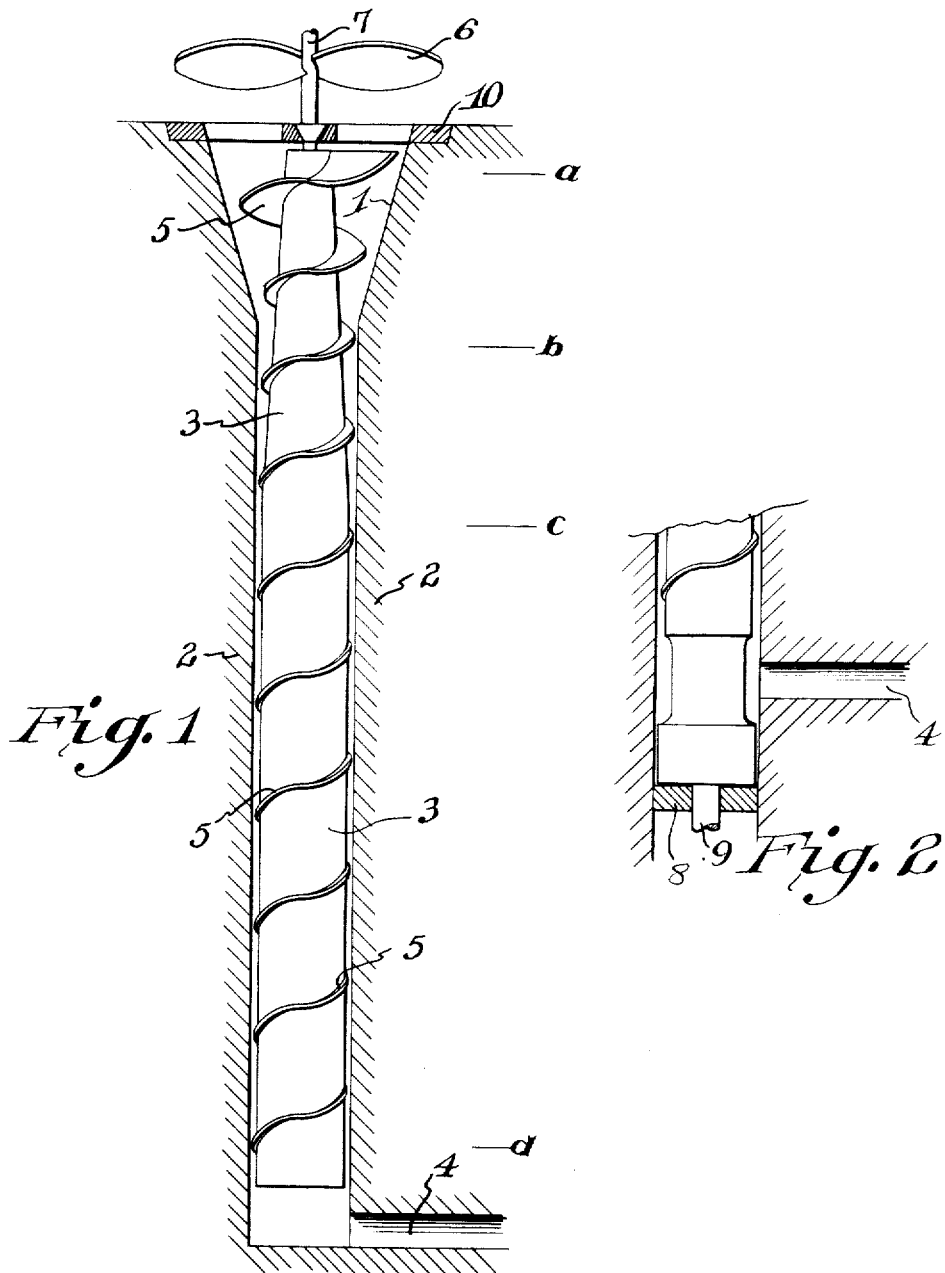

2,805,627

CONVEYOR

Robert Murray Bendett, Seaford, and Edwin Clifton Sutton, Wilmington, Del., assignors to E. I. du Pont de Nemours & Company, Wilmington, Del., a corporation of Delaware Application July 8, 1953, Serial No. 366,711

10 Claims. (Cl. 103—89)

This invention relates to means for conveying viscous fluids. More particularly, it relates to apparatus for transferring material from sub-atmospheric pressure levels to super-atmospheric pressure levels and more particularly to screw pumps for converting bubble-containing viscous fluids at sub-atmospheric pressure levels into bubble-free, homogeneous, viscous fluids at super-atmospheric pressure levels.

Gear pumps and screw pumps are generally employed for moving fluids from one pressure level to a higher pressure level and some modifications of these are also known to exert an action on the fluid which dissolves the bubbles in it. These prior art pumps, however, are normally operated with fluid feeds supplied at atmospheric pressure or above. The usual commercial exemplification of these pumps will not operate satisfactorily at low pressures (e. g. 10 mm. or less). Although these pumps can be made to work at least to some degree by tremendously enlarging the entrance passages and by markedly enlarging the pump itself to compensate for the required large drop in operating speeds, the resulting apparatus is so cumbersome and expensive as to be wholly impracticable for commercial operation.

It is an object of this invention to provide an apparatus which will receive and feed, at pressures below 10 mm. of mercury, a bubble-containing viscous fluid, compress the fluid to eliminate the bubbles and deliver the bubble-free viscous fluid at an appreciable pressure. It is a still further object to provide a compact, practicable apparatus capable of achieving high rates of output. Other objects will appear hereinafter in the specification and in the claims.

The objects of this invention are accomplished by employing an apparatus comprising a screw in a cylindrical bore with an upper enlarged feed section, said bore having a substantially constant diameter and said screw fitting closely therein and expanding into the upper enlarged feed section and the shaft of said screw increasing in diameter from the feed end to a point intermediate between the extremities of the constant diameter bore and then continuing at constant diameter therefrom to the point of extrusion, said constant diameter of said screw shaft closely approaching the internal diameter of said bore.

Figure I, showing one form of the device of this invention, is an elevation of the screw within a bore shown in cross-section; and Figure II is a detail of a modification of the outlet end.

Referring now to Figure I, it is seen that the apparatus comprises a bore having a conical entrance or feed section 1, the entrance area of which is described by a circle of 12 inch diameter. This conical section extends for 10 inches where it meets and merges with the constant diameter section of the bore 2, the inside diameter of which is 6¼ inches. This section of the bore extends for 62 inches. The screw shaft 3, which may have inlet paddle 6 mounted thereon and which may be steadied by bearing 10, has a diameter of 3 9/16 inches at the entrance to the conical feed section and gradually increases to a diameter of 5⅜ inches in a length of 22 inches and thereafter is of constant diameter (i. e. 5⅜ inches) to the point of discharge where the diameter may be somewhat decreased to facilitate flow of the viscous fluid to the discharge tube 4. The helical screw 5 has a constant pitch of 7.0 inches per thread and a constant helix angle of 20.6° throughout its length. The screw flights have a thickness of 3/16 inch. Within the delivery section ($c$—$d$), the thread depth is 9/32 inch and the thread clears the bore by 1/64 radially. The flight diameter at the entrance to the conical section is 9 inches and decreases gradually to a diameter of 6 7/32 inches through a vertical travel of 10 inches. Broadly speaking, the section from $a$ to $b$ is the feed section, that from $b$ to $c$ is the compressing section, and that from $c$ to $d$ is the delivery section. The screw shaft is driven by a motor (not shown) attached at end 7.

Such a screw pump, for example, will feed itself at 1 mm. of mercury absolute pressure with a bubble-containing fluid having a viscosity of 5,000 poises, compress the fluid to eliminate bubbles and deliver the fluid uniformly at 1,000 pounds per hour and at a discharge pressure of 1,000 pounds per square inch by employing a rotational speed of approximately 35 R. P. M. If the delivery section of this screw pump is reduced from 52 inches to 15 inches, the discharge pressure is reduced from 1,000 to 100 pounds per square inch when the outer operating conditions are maintained constant.

These pumps are customarily jacketed in sections to provide for either cooling or heating means, or both, as may be required to maintain a uniform temperature level from the entrance to the exit.

When these pumps are used for pumping viscous liquids with a viscosity range within the limits of 500 to 10,000 poises from a supply chamber where the absolute pressure is within the range of 1 micron up to 10 to 20 mm. of mercury to a receiving system at a pressure within the range of 100 pounds per square inch up to 1,000 pounds per square inch or even more, the dimensions of the described apparatus are critical. The open area of the entrance to the conical feed section (open area is defined as cross-sectional bore area minus cross-sectional shaft area) should be at least 5 times (6.5 for the example given above) the open area of the entrance to the compression section. The open area at the inlet to the compression section falls within the limits of 1.5 to 3 times (2.7 for the cited example) the open area of the delivery section, and the length of the compression section is at least 1.25 times the screw pitch. The open area of the delivery section falls within the limits of 0.10 to 0.25 times (0.22 for the given example) the cross-sectional area of the shaft within this section. The length of the delivery section will be dependent upon the desired discharge pressure and can be determined approximately from the following equation:

$$L = \frac{P \max \tan \theta \, H^2}{6\pi DVN}$$

Where:

L = length of pressure section
P max = pressure developed at zero discharge
Tan $\theta$ = tan helix angle of screw
H = depth of screw thread
D = screw diameter
V = viscosity of fluid
N = screw speed The screw flight diameter at the entrance to the conical feed section is within the limits of 1.25 to 1.75 times (1.4 for example) the screw flight diameter in the delivery section. The length of the conical feed section is at least 1.25 times the screw pitch. To insure the most efficient transfer of the viscous fluid from the low pressure level to the high pressure level, it is desirable to rotate the screw within the range of 10 to 60 R. P. M. Higher speeds are likely to produce sufficient work and heat to degrade the viscous material.

The construction of screw pumps within the critical limits of this invention results in screw pumps which are admirably suited for conveying a viscous liquid from a sub-atmospheric pressure level at high rates of throughput to a super-atmospheric pressure level.

The pump of this invention maintains a relatively even discharge pressure, for example, of 1,000 pounds per square inch over a wide range of throughputs. While it is shown in Figure I in a vertical position, it may be used in any desired position; for example, it may be used horizontally. The inlet paddle 6 is not essential and the inlet may have a sudden enlargement in respect to long bore 2. For example, the inlet section need not be conical and may be rectangular or box-like in shape or cylindrical of larger bore than the main bore, or combinations of these. With such modifications, the screw helices in the feed section may be altered if desired. In general, those depicted function satisfactorily. If desired, in the conical outlet, the helices may be constructed to follow the contour of the cone more closely. In general, the conical feed section with the helices as shown is preferred. If desired, the pitch of the screw in the feed section may be greater than in the compressing or delivery sections. While the screw is generally driven at the inlet end, it may be driven at the outlet end. In this modification, the screw shaft does not terminate at the outlet end but continues and is mounted in bearing 8 and then driven by the motor attached at end 9. In the preferred modification, the motor is at the inlet end and the screw shaft terminates just above the outlet 4. No bearing is needed, for the inside walls of the bore 2 effect journalling.

The apparatus of this invention represents an important advance in the art of shaping articles. Frequently, difficulty is encountered in the extruding of melts of polymers or plasticizer/polymer blends due to bubbles in the mass to be extruded. Bubbles lead to unsatisfactory shaped articles and feed of the melt to the extrusion orifice or the spinneret cannot be kept constant when bubbles are present. Frequently, a mass to be extruded has to be agitated and/or subjected to reduced pressures in order to remove volatile material. Such treatments lead to bubble formation. In those operations, the treated mass may be fed to the device of this invention and from there, in bubble-free form, to the extrusion orifice or spinneret.

Any modification which conforms to the principles of the invention described herein is intended to be included within the scope of the claims below.

I claim:

1. Apparatus for the extrusion of materials which comprises a block having a bore therein; in said bore a section of substantially constant diameter constituting the major length of said bore; preceding said major section an inlet section larger in diameter than said major section; positioned in said bore a screw comprising a shaft and securely attached thereto relatively narrow helical screw flights fitting closely in said major section and expanding into the said larger inlet section, the shaft of the screw increasing in diameter from the inlet to a point intermediate between the extremities of the constant diameter section and then continuing at constant diameter therefrom to the end of said shaft; and near the end of said bore, an outlet in said block communicating with the said bore for delivering said materials.

2. Apparatus in accordance with claim 1 wherein said shaft terminates just before said outlet.

3. Apparatus in accordance with claim 1 wherein the screw flights on said screw in said major section are of substantially constant pitch and substantially constant helix angle.

4. Apparatus in accordance with claim 1 having an auxiliary propelling means mounted on said shaft adjacent to the said inlet section of said bore.

5. The apparatus of claim 1 in which the maximum cross section of the said inlet section, minus the cross-sectional area of the shaft, is at least 5 times the open area of the exit of the said inlet section.

6. The apparatus of claim 1 in which the open area at the exit of the said inlet section is between about 1.5 and 3 times the open area of the said major section.

7. The apparatus of claim 1 in which the distance between the exit of the inlet area and the entrance to the said major section is at least 1.25 times the screw pitch.

8. The apparatus of claim 1 in which the open area of the said major section is from 0.10 to 0.25 times the cross-sectional area of the shaft within this section.

9. The apparatus of claim 1 in which the screw-flight diameter at the entrance of the said inlet section is from 1.25 to 1.75 times the screw-flight diameter in the said major section.

10. The apparatus of claim 1 in which the said inlet section is frusto-conical and the length of this section is at least 1.25 times the screw pitch.

References Cited in the file of this patent

UNITED STATES PATENTS

| | | |
|---|---|---|
| 425,660 | Crannell | Apr. 15, 1890 |
| 551,852 | Desgoffe | Dec. 24, 1895 |
| 1,359,472 | Brown | Nov. 16, 1920 |
| 1,778,589 | Eerkes | Oct. 14, 1930 |
| 2,013,078 | Slocum | Sept. 3, 1935 |
| 2,045,757 | Constantin | June 30, 1936 |
| 2,106,600 | Hepler | Jan. 25, 1938 |
| 2,419,146 | Kimm et al. | Apr. 15, 1947 |

FOREIGN PATENTS

| | | |
|---|---|---|
| 31,076 | Denmark | Dec. 28, 1922 |
| 295,999 | Italy | Mar. 6, 1932 |
| 303,192 | Italy | Nov. 23, 1932 |
| 687,654 | France | Oct. 12, 1930 |

UNITED STATES PATENT OFFICE

CERTIFICATE OF CORRECTION

Patent No. 2,805,627 September 10, 1957

Robert Murray Bendett et al.

It is hereby certified that error appears in the printed specification of the above numbered patent requiring correction and that the said Letters Patent should read as corrected below.

Column 2, line 29, for "outer" read --other--; column 3, line 26, for "outlet" read --inlet--.

Signed and sealed this 3rd day of December 1957.

(SEAL)
Attest:
KARL H. AXLINE

Attesting Officer

ROBERT C. WATSON
Commissioner of Patents